United States Patent [19]

Schulte et al.

[11] Patent Number: 4,695,166
[45] Date of Patent: Sep. 22, 1987

[54] PISTON METERING DEVICE FOR THE PRODUCTION OF PLASTIC MATERIAL FROM AT LEAST TWO FLOWABLE REACTION COMPONENTS

[75] Inventors: Klaus Schulte; Klaus Nadolski; Heinrich Ersfeld, all of Leverkusen; Wilfried Ebeling, Odenthal-Gloebusch; Heinrich Boden, Leverkusen; Walter Schneider, Overath, all of Fed. Rep. of Germany

[73] Assignee: Bayer Aktiengesellschaft, Leverkusen, Fed. Rep. of Germany

[21] Appl. No.: 872,344

[22] Filed: Jun. 6, 1986

[30] Foreign Application Priority Data

Jun. 21, 1985 [DE] Fed. Rep. of Germany ....... 3522153

[51] Int. Cl.$^4$ ............................................. B01F 15/04
[52] U.S. Cl. .................................. 366/160; 366/151; 422/133
[58] Field of Search ............... 366/136, 137, 151, 152, 366/159, 160, 161; 422/133

[56] References Cited

U.S. PATENT DOCUMENTS

| 2,788,953 | 4/1957 | Schneider | 366/161 |
| 3,843,099 | 10/1974 | Duncan | 366/152 |
| 4,171,191 | 10/1979 | Krueger | 366/161 |
| 4,399,104 | 8/1983 | Coblenz et al. | 422/133 |
| 4,442,070 | 4/1984 | Proksa et al. | 422/133 |
| 4,572,820 | 2/1986 | Boden et al. | 422/133 |

FOREIGN PATENT DOCUMENTS 1778053 6/1972 Fed. Rep. of Germany.

Primary Examiner—Robert W. Jenkins
Assistant Examiner—C. Reinckens
Attorney, Agent, or Firm—Gene Harsh; Joseph C. Gil; Lyndanne M. Whalen

[57] ABSTRACT

A piston metering device for the production of a plastic material from at least two flowable reaction components. This device is basically composed of (a) a hydraulic driving mechanism, (b) two piston cylinder units, (c) a mixer head and, optionally, (d) a control device common to at least one of the piston cylinder units. This device permits rapid and simple adjustment of the metering ratio of reaction components by adjustment of throughput. Such adjustment is accomplished by means of regulating elements made of hydraulic motors rigidly coupled to one another.

8 Claims, 1 Drawing Figure

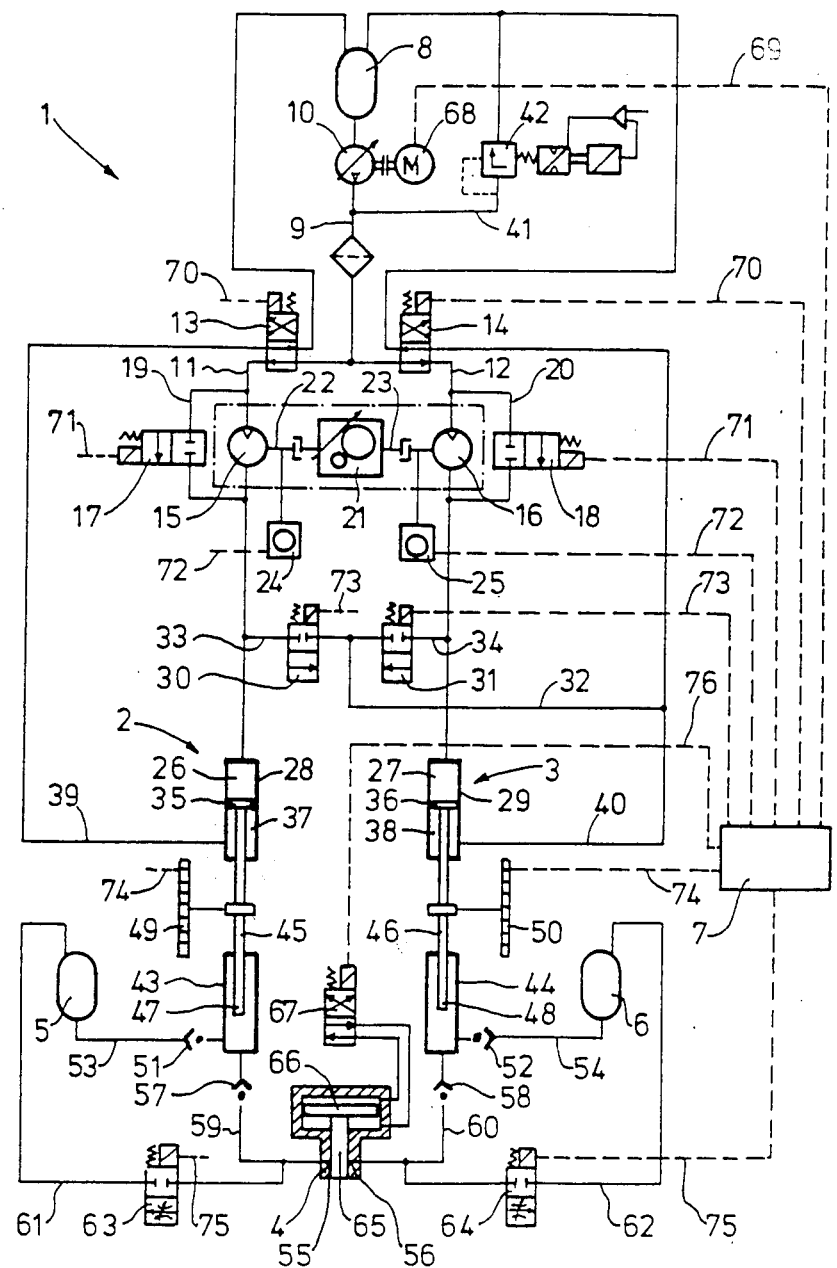

PISTON METERING DEVICE FOR THE PRODUCTION OF PLASTIC MATERIAL FROM AT LEAST TWO FLOWABLE REACTION COMPONENTS

BACKGROUND OF THE INVENTION

The present invention relates to a piston metering device.

In piston metering devices such as those described in German Offenlegungsschrift No. 1,778,053, the regulating elements are composed of throttles or gear pumps. The throughflow mixing of hydraulic fluid must be adjusted separately at each regulating element. This separate adjustment has proven to be very time consuming and susceptible to breakdown during operation.

SUMMARY OF THE INVENTION

It is an object of the present invention to improve piston metering devices to allow rapid and simple adjustment of the metering ratio of the reaction components by suitable adjustment of the throughput to maintain the metering ratio during the metering and mixing process or to intentionally alter that ratio.

This object is achieved by arranging the regulating elements composed of hydraulic motors rigidly coupled to one another in branch lines.

BRIEF DESCRIPTION OF THE DRAWING

The FIGURE is a schematic representation of a piston metering device within the scope of the present invention.

DETAILED DESCRIPTION OF THE INVENTION

The present invention relates to a piston metering device for the production of a plastics material, in particular a foam-forming flowable reaction mixture from at least two flowable reaction components. This device has a hydraulic driving mechanism for a piston cylinder unit which can be loaded hydraulically on alternate sides of the drive side for each reaction component. Each piston cylinder unit has a working cylinder with plunger piston on the working side. The working cylinder can be connected to a supply container for the corresponding reaction component and to a common mixer head. The hydraulic driving mechanism has a storage container for hydraulic fluid which is connected to a hydraulic metering pump and a pressure line with a change-over value which branches into two lines from the hydraulic metering pump. Each of these lines from the metering pump is equipped with a regulating element and leads to one of the two piston metering units and opens into the hydraulic chamber (mixing stroke chamber) of the piston cylinder unit. This piston cylinder unit meters the corresponding component to the mixer head during charging. A return line leads back from the second hydraulic chamber (filling stroke chamber) via the associated change-over valve to the storage container. Optionally, a common control device is present.

The throughflow mixing ratio of the two hydraulic branch streams is continuously maintained by the coupling of the hydraulic motors. If the hydraulic motors have the same volumetric displacement, the metering ratio is 1:1. However, it is also possible to use hydraulic motors with a different volumetric displacement in order to achieve a different metering ratio. It is also possible to provide further hydraulic motors which can be connected via lines and check valves if necessary.

A particularly advantageous embodiment is characterized by hydraulic motors coupled by means of a control gear. In this way, no further hydraulic motors are required for adjusting different metering ratios. A higher throughflow mixing per unit of time can be achieved by gearing down or gearing up the differing speeds of the hydraulic motors while the volumetric displacement remains constant, so that a selected metering ratio can be attained. The hydraulic motors remain rigidly coupled in spite of the gearing up by the control gear. Steplessly variable ratio gears as well as step control gears can be used as control gears. In the first case, any metering ratios can be adjusted whereas, in the second case, only those corresponding to the control steps can be adjusted.

By-pass lines which go round the hydraulic motors and have check valves are preferably provided. The by-pass lines with check valves ensure that the entire line system of the two components (which can be compressed differently if necessary) can be prestressed to the mixer head.

In another embodiment, at least one piston cylinder unit is provided with a displacement transducer connected to a control device. This enables the total quantity of material to be metered in each mixing process to be adjusted by predetermining the course of the piston. At the beginning of the mixing stroke, the displacement transducer transmits a zero signal to the control device. The control device interrupts the mixing process when the predetermined distance or time interval has been reached.

In another embodiment, a revolution counter is connected to a control device allocated to at least one hydraulic motor. This embodiment is an alternative to the previously discussed embodiment. The entire quantity of components to be mixed is adjusted via a predetermined number of revolutions. The signals are transmitted to the control device in a manner similar to that described in the previous embodiment. A return line branching between the hydraulic motors and the piston cylinder units via check valves is preferably connected to the branch lines. This embodiment has the advantage that the hydraulic fluid can first be conveyed via the hydraulic motors in the low pressure cycle so that the metering ratio of the reaction components can be adjusted during this period by selecting the quantity metered per unit of time of the hydraulic motor. During this period of adjustment the piston cylinder unit need not be charged at all.

Another embodiment is characterized by a return line which branches from the pressure line between hydraulic metering pump and change-over valve via a pressure limiting valve. This feature enables the entire line system to be prestressed to a predetermined high pressure to which the pressure limiting valve is adjusted. On reaching this pressure, the pressure limiting valve opens and the hydraulic fluid can be circulated. If the injection openings in the mixer head are then opened, the pressure suddenly drops, the pressure limiting valve closes and the metering and mixing process begins.

One embodiment of the new piston metering device is shown schematically in the attached drawing and is described in more detail below.

The piston metering device is basically made up of four sub-assemblies, namely (a) a hydraulic driving mechanism 1, (b) two piston cylinder units 2,3, (c) a mixer head 4 with storage containers 5, 6 for the reaction components and (d) a control device 7 common to all of them. The hydraulic driving mechanism 1 is made up of a storage container 8 for high-viscosity hydraulic fluid, from which a line 9 leads to a hydraulic metering pump 10 and branches into lines 11, 12 in which a change-over valve 13, 14 and a hydraulic motor 15, 16 are arranged in series. By-pass lines 19, 20 which pass round the hydraulic motors 15, 16 and contain check valves 17, 18 are connected to the hydraulic motors 15, 16. The hydraulic motors 15, 16 are joined together by a control gear 21. The shafts of the control gear 22, 23 are provided with revolution counters 24, 25. Instead of the control gear 21, the two hydraulic motors 15, 16 can be coupled very simply via a rigid coupling, in which case only one revolution counter is required. The lines 11, 12 open into the mixing stroke chamber 26, 27 of the hydraulic cylinders 28, 29 of the piston cylinder units 2, 3. The branch lines 33, 34 which contain check valves 30, 31 and combine in one line member 32 branch from the line arms 11, 12 between the hydraulic motors 15, 16 and the mixing stroke chambers 26, 27. The hydraulic cylinders 28,29 are sub-divided by hydraulic pistons 35, 36 into mixing stroke chambers 26, 27 and into filling stroke chambers 37, 38. Return lines 39, 40 lead from the filling stroke chambers 37, 38 back into the storage container 8 via the change-over valves 13, 14. Line member 32 opens into return line 40 and also leads back into storage container 8 via change-over valves 13, 14. Line 41 branches off upstream of the hydraulic metering pump 10 via a pressure limiting valve 42 and opens into the return line 40.

The piston cylinder units 2, 3 are each made up of a working cylinder 43, 44 into which dip plunger pistons 47, 48 are rigidly connected via piston rods 45, 46 to the hydraulic pistons 35, 36. Adjustable displacement transducers 49, 50 are connected to the piston rods 45, 46. Supply lines 53, 54 equipped with non-return valves 51, 52 lead from storage containers 5, 6 for polyol and isocyanate into the working cylinders 43, 44. Lines 59, 60 also equipped with non-return valves 57, 58 lead from the working cylinders 43,44 to the mixer head 4 and open via injection openings 55,56. Return lines 61, 62 lead from the lines 59, 60 via check valves 63,64 back to the storage containers 5, 6. The mixer head 4 is provided with an injection piston 65 with hydraulic driving mechanism 66 to which a change-over valve 67 is connected. The hydraulic pump and reservoir are not illustrated.

All functional and controllable elements are connected to the control device 7. More specifically, the driving motor 68 of the hydraulic metering pump 10 is connected to control device 7 via a pulse line 69. The change-over valves 13, 14 are connected to control device 7 via a pulse line 70. The check valves 17, 18 are connected to control device 7 via a pulse line 71. The revolution counters 24, 25 are connected to a control device via a pulse line 72. The check valves 30, 31 are connected to control device 7 via a pulse line 73. The displacement transducers 49, 50 are connected to control device 7 via a pulse line 74. The check valves 63, 64 are connected to control device 7 via a pulse line 75. And the change-over valve 67 is connected to control device 7 via a pulse line 76.

The mode of operation of the new piston metering device is as follows. The hydraulic metering pump 10 is actuated by the control device 7 via the pulse line 69 and the driving motor 68. The check valves 17, 18 are closed in this process and the check valves 30, 31 open. The hydraulic fluid now flows through the hydraulic motors 15, 16 at a low pressure (e.g. about 8 bar) and is recirculated into the storage container 8. During this phase of the cycle, the metering ratio of the two reaction components is preselected by selecting a suitable control step for the control gear 21. The check valves 30, 31 are then closed and the check valves 17, 18 opened. The hydraulic fluid now stresses the entire line system, including the lines 59, 60. A certain pressure build-up period is required for this purpose. On reaching the pressure of 200 bar which is predetermined by the pressure limiting valve 42, this valve 42 opens and the hydraulic fluid flows at this pressure, which pressure is somewhat higher than the working pressure. The hydraulic fluid is recirculated via the line 41 into the storage container 8. The check valves 17, 18 are now closed. The piston metering device is ready for a mixing process.

The change-over valve 67 is then actuated via the pulse line 76 from the control device 7 so that the driving mechanism 66 drives back the ejection and control piston 65, thus clearing the mixing chamber and the injection openings 55, 56. The primed pressure suddenly drops: the pressure limiting valve 42 therefore closes and the hydraulic fluid flows via the hydraulic motors 15, 16 into the mixing stroke chambers 26, 27. At the same rate as the mixing stroke chambers 26, 27 fill, the plunger pistons 47, 48 press the reaction components through the lines 59,60 into the mixer head 4 where they are mixed. The pressure is adjusted to about 150 bar in the line system during the injection phase.

The metering and mixing period can be controlled and adjusted in two ways. On the one hand, it is possible to adjust it to a specific number of revolutions corresponding to the necessary quantity of components to be metered. On reaching the present number, a signal is transmitted via the pulse line 72 to the control device 7 and the control device 7 transmits a command via the pulse line 76 to the change-over valve 67 so that the control and ejection piston 65 travels into the mixing chamber and interrupts the metering and mixing process. On the other hand, it is also possible to determine the quantity of components to be metered by measuring or predetermining the displacement. The displacement transducers 49, 50 are designed in such a way that they transmit a start pulse via the pulse line 74 to the control device 7 at the beginning of the stroke. The change-over valve 67 and the control and ejection piston 65 are then actuated in turn from the control device 7 via the pulse line 76. After a predetermined time interval or predetermined stroke length, which corresponds to the necessary quantity to be metered, the mixing process is terminated via the pulse line 76 by switching over the change-over valve 67, as described above.

Immediately after the metering and mixing process, the pressure builds up again in the entire line system until the pressure limiting valve 42 opens and the hydraulic fluid flows via the line 41 into the storage container 8. The working cylinders 43, 44 must now be filled again. For this purpose, the change-over valves 13, 14 are actuated so that the hydraulic fluid now flows via the lines 39, 40 into the filling stroke chambers 37, 38. The plunger pistons 47, 48 travel back and suck the components from the storage containers 5,6. Once the piston metering device has been brought back into the starting position on completion of the filling process, the next operating cycle can begin. During the intervals between operating cycles, the reaction components are circulated to temper and homogenize them by opening the check valves 63, 64 provided with throttles. In this case, the piston metering device must continuously form ejection strokes and filling strokes alternately.

What is claimed:

1. A piston metering device for the production of a plastic material from at least two flowable reaction components comprising:
   (a) a hydraulic driving mechanism
   (b) a storage container for hydraulic fluid which is connected to the driving mechanism (a)
   (c) a hydraulic metering pump which is connected to storage container (b)
   (d) a pressure line with a change-over valve which line is connected to metering pump (b),
   (e) two lines which branch from pressure line (d)
   (f) a regulating element for each of the lines (e) made up of hydraulic motors rigidly coupled to one another,
   (g) two piston metering units each of which is connected to one or the other of the branch lines (e) which metering units are made up of
      (1) a working cylinder with a plunger piston and
      (2) a storage container to which the plunger piston of (1) is connected
   (h) two mixing stroke chambers each of which is connected to one or the other piston metering units (g)
   (i) two filling stroke chambers each of which is connected to one or the other of the mixing stroke chambers (h)
   (j) a mixer head to which each of the filling stroke chambers (i) leads and which is connected to each of the storage container (g)(2) and
   (k) two return lines each of which leads back from one or the other filling stroke chamber (i) through the change-over valve and to one of the storage containers (g)(2).

2. The piston metering device of claim 1 which further includes (1) a control gear for each of the motors of regulating element (f).

3. The piston metering device of claim 1 which further includes (m) two by-pass lines with check valves each of which goes around one or the other of the motors of regulating element (f).

4. The piston metering device of claim 1 which further includes (n) a displacement transducer for filling stroke chamber (i) and (o) a control device to which the transducer (n) is connected.

5. The piston metering device of claim 1 which further includes (p) a revolution counter connected to the hydraulic motor of regulating element (f) and (o) a control device to which the revolution counter is connected.

6. The piston metering device of claim 1 which further includes (q) a return line branching off of a line (e) between the hydraulic motor of regulating element (f) and a mixing stroke chamber (h) via a check valve.

7. The piston metering device of claim 1 which further includes (r) a return line which branches from pressure line (d) between hydraulic metering pump (b) and the change-over valve of pressure line (d) via a pressure limiting valve.

8. The piston metering device of claim 1 which further includes
   (l) a control gear for each of the motors of regulating element (f),
   (m) two by-pass lines with a check valve each of which goes around one or the other of the motors of regulating element (f),
   (n) a displacement transducer for a filling stroke chamber (i),
   (o) a control device to which the transducer (n) is connected,
   (p) a revolution counter connected to the hydraulic motor of regulating element (f) and to control device (o),
   (q) a return line branching off of a line (e) between the hydraulic motor of regulating element (f) and a mixing stroke chamber (h) via a check valve and
   (r) a return line which branches from pressure line (d) between hydraulic metering pump (b) and the change-over valve of pressure line (d) via a pressure limiting valve.

* * * * *